US008812663B2

(12) United States Patent
Tan Ming Yu et al.

(10) Patent No.: US 8,812,663 B2
(45) Date of Patent: Aug. 19, 2014

(54) NETWORK DELAY ESTIMATION APPARATUS AND A NETWORK DELAY ESTIMATION METHOD

(75) Inventors: Jonathan Tan Ming Yu, Selangor (MY); Boon Ping Lim, Selangor (MY); Ettikan Kandasamy Karuppiah, Salengor (MY); Eiichi Muramoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 201 days.

(21) Appl. No.: 13/500,382

(22) PCT Filed: Feb. 25, 2011

(86) PCT No.: PCT/JP2011/001108
§ 371 (c)(1),
(2), (4) Date: Apr. 5, 2012

(87) PCT Pub. No.: WO2012/023223
PCT Pub. Date: Feb. 23, 2012

(65) Prior Publication Data
US 2012/0198060 A1      Aug. 2, 2012

(30) Foreign Application Priority Data
Aug. 20, 2010   (JP) .................................. 2010-185028

(51) Int. Cl.
*G06F 15/173* (2006.01)
*H04L 12/56* (2006.01)
(52) U.S. Cl.
CPC ................. *H04L 45/12* (2013.01); *H04L 45/48* (2013.01)
USPC ....................................................... 709/224
(58) Field of Classification Search
CPC .......... H04L 45/02; H04L 45/48; H04L 45/12
USPC ......................................................... 709/224
See application file for complete search history.

(56) References Cited

U.S. PATENT DOCUMENTS 6,717,921 B1 * 4/2004 Aggarwal et al. ............. 370/256
2008/0304421 A1  12/2008 Ramasubramanian et al.

OTHER PUBLICATIONS

International Search Report for PCT/JP2011/001108 dated May 31, 2011.
Peter Buneman, A Note on the Metric Properties of Trees, Journal of combinatorial theory (B) 17, Feb. 1974 pp. 48-50.
Shirai Saito, Taura, "A Fast Topology Inference : A Building Block for Network-aware Parallel Processing", Senshinteki Keisan Kiban System Symposium SACSIS2007 Ronbunshu, May 2007, pp. 329-337.

* cited by examiner

*Primary Examiner* — Hee Soo Kim
(74) *Attorney, Agent, or Firm* — Pearne & Gordon LLP

(57) ABSTRACT

A network delay estimation apparatus capable of creating a metric tree with high accuracy and in a short time. Network delay estimation apparatus (302) includes first-round measurement target node selection section (306) that selects one pair or a plurality of pairs of nodes located at a long distance from each other from a known metric tree as first-round measurement target nodes and measures a distance from an arbitrary node, second-round measurement target node selection section (310) that selects a node whose distance from the arbitrary node is estimated to be short as a second-round measurement target based on the distance and a known metric tree and measures a distance from the arbitrary node, and an optimum tree processing section (314) that creates a network metric tree including the arbitrary node based on the distance and the known metric tree.

6 Claims, 19 Drawing Sheets

| EGRESS NODE ID | INGRESS NODE ID | DELAY |
|---|---|---|
| ... | | |
| | | |
| | | |

FIG.6

| 1708 | 1710 | 1712 |
|---|---|---|
| TREE ID | NODE ID | TYPE |
| ... | | |
| | | |
| | | |

| 1720 | 1722 | 1724 | 1726 |
|---|---|---|---|
| TREE ID | EGRESS NODE ID | INGRESS NODE ID | DISTANCE |
| ... | | | |
| | | | |
| | | | |

| NODE ID | TYPE | EGRESS NODE ID | INGRESS NODE ID | DISTANCE |
|---|---|---|---|---|
| | | | | |
| | | | | |
| | | | | |

NETWORK DELAY ESTIMATION APPARATUS AND A NETWORK DELAY ESTIMATION METHOD

TECHNICAL FIELD

The present invention relates to a network delay estimation apparatus and a network delay estimation method for creating a metric tree describing delays between nodes of a network.

BACKGROUND ART

Internet communication is distributed among many nodes operating in conjunction with each other aiming at a particular task, and the degree of interdependence among those nodes is increasing. Furthermore, peer-to-peer communication, grid computing, cluster computing and ALM (application layer multicasting) or the like are new technologies relying on cooperation and communication among many nodes. Applications using these technologies are required to construct a metric tree describing delays among nodes of a network in order to accurately execute interdependent tasks. This is because delays among arbitrary nodes can be immediately estimated by constructing the metric tree.

However, when the number of nodes to be measured is N, if delays are measured in full-mesh according to round robin algorithm, the number of measurements performed becomes N×N−1. Therefore, when there are many nodes to be measured, a long processing time, high computation capacity and large storage capacity are required to construct a metric tree. When the burden is large in this way, depending, for example, on application, a situation may occur in which when the construction of the metric tree is completed, the timing at which the metric tree is required may have already passed.

Therefore, for example, Non-Patent Literature 1 describes a technology that every time a new node is added to a network, a delay between the joining node and a node of a known metric tree is measured and the measurement result is added to the metric tree. According to this technology, it is possible to construct a metric tree without performing delay measurement in full mesh.

However, the technology described in Non-Patent Literature 1 can estimate delays with respect to other nodes which are not measured with only low accuracy.

Therefore, for example, Patent Literature 1 describes a technology of selecting two nodes estimated to be nearest to (distance from) a joining node as a measurement target. According to this technology, it is possible to estimate delays with respect to other nodes which are not measured, with high accuracy.

CITATION LIST

Patent Literature

PTL 1
U.S. Patent Application Publication No. 2008/0304421 Specification

Non-Patent Literature

NPL 1
Peter Buneman, "A Note on the Metric Properties of Trees", Journal of combinatorial theory(B) 17, February 1974, p. 48-50,

SUMMARY OF INVENTION

Technical Problem

However, the technology described in Patent Literature 1 can estimate, when estimation of two nodes close to a joining node results in an error, delays between the joining node and the other nodes which are not measured with only low accuracy. That is, the technology described in Patent Literature 1 needs to identify two nodes close to the joining node to improve the accuracy of the metric tree. For this reason, the technology described in Patent Literature 1 ends up measuring delays for many nodes, resulting in a problem that it takes time to construct the metric tree.

It is an object of the present invention to provide a network delay estimation apparatus and a network delay estimation method capable of creating a metric tree with high accuracy and in a short time.

Solution to Problem

A network delay estimation apparatus according to the present invention is a network delay estimation apparatus that creates a metric tree describing delays among nodes of a network including a plurality of nodes, including a first-round measurement target node selection section that selects one pair or a plurality of pairs of nodes located at a long distance from each other as first-round measurement target nodes from a known metric tree and measures a distance between an arbitrary node and each first-round measurement target node, a second-round measurement target node selection section that selects a node whose distance from the arbitrary node is estimated to be short as a second-round measurement target based on the distance from the first-round measurement target node and the known metric tree and measures a distance between the arbitrary node and each second-round measurement target node, and an optimum tree processing section that creates a metric tree of a network including the arbitrary node based on the distance from the second-round measurement target node and the known metric tree.

A network delay estimation method according to the present invention is a network delay estimation method for creating a metric tree describing delays between nodes of a network including a plurality of nodes, including a step of selecting one pair or a plurality of pairs of nodes located at a long distance from each other as first-round measurement target nodes from a known metric tree and measuring a distance between an arbitrary node and each first-round measurement target node, a step of selecting a node whose distance from the arbitrary node is estimated to be short based on the distance from the first-round measurement target node and the known metric tree as a second-round measurement target and measuring a distance between the arbitrary node and each second-round measurement target node, and a step of creating a metric tree of a network including the arbitrary node based on the distance from the second-round measurement target node and the known metric tree.

Advantageous Effects of Invention

According to the present invention, it is possible to estimate with high accuracy which node is close to an arbitrary node and thereby create a metric tree with high accuracy and in a short time.

BRIEF DESCRIPTION OF DRAWINGS

FIG. 6 is a diagram illustrating a configuration example of metric data according to the present embodiment;

FIG. 7 is a diagram illustrating a configuration example of candidate tree data according to the present embodiment;

FIG. 8 is a diagram illustrating a configuration example of optimum tree data according to the present embodiment;

DESCRIPTION OF EMBODIMENTS

Hereinafter, an embodiment of the present invention will be described in detail with reference to the accompanying drawings.

Prior to a description of the present embodiment, definitions of main terms in the present embodiment will be described first.

A "tree" refers to a structure of a network made up of nodes and edges connecting the nodes. A "metric tree" refers to a non-directional virtual tree describing delays between nodes of a network made up of nodes and weighted edges indicating communication delays between the nodes.

A "network metric" refers to a characteristic value of a network indicating the magnitude of a delay between two nodes and is the sum of values of edges between two nodes.

A "real node" refers to a physical node. that actually exists in a network out of nodes constituting a metric tree.

A "virtual node" refers to a virtual node which is actually nonexistent in a network out of nodes constituting a metric tree and is a node used to create a network metric between pairs of real nodes, which will be described later.

A "candidate tree" refers to a temporary metric tree created as part of a tree construction mechanism when a joining node is added to a network and is a tree used to select a measurement target node.

An "optimum tree" refers to a metric tree of a network including joining nodes selected as an optimum tree from the candidate tree and is a tree used for subsequent delay estimations.

A "new real node" refers to a real node last added to the metric tree (this node normally refers to a joining node).

A "new virtual node" refers to a virtual node last added to the metric tree.

A "current optimum tree" refers to the last optimum tree generated in the past.

A "joining node" refers to a node that requests joining the network, which does not exist in the current optimum tree.

A "measurement target node" refers to a real node whose delay with respect to a joining node is actually measured among real nodes of the current optimum tree.

A "first-round measurement target node" refers to a measurement target node selected simply based on the position of each real node in the current optimum tree.

A "primary first-round measurement target node" refers to a pair of first-round measurement target nodes initially selected in a first-round delay measurement.

A "secondary first-round measurement target node" refers to a pair of first-round measurement target nodes selected from among real nodes other than the primary first-round measurement target node after the primary first-round measurement target node is selected in the first-round delay measurement.

A "second-round measurement target node" refers to a measurement target node selected based on not only the position of each real node in the current optimum tree but also a delay measurement result between a joining node and a first-round measurement target node after a first-round delay measurement.

(Embodiment)

Figure 1:
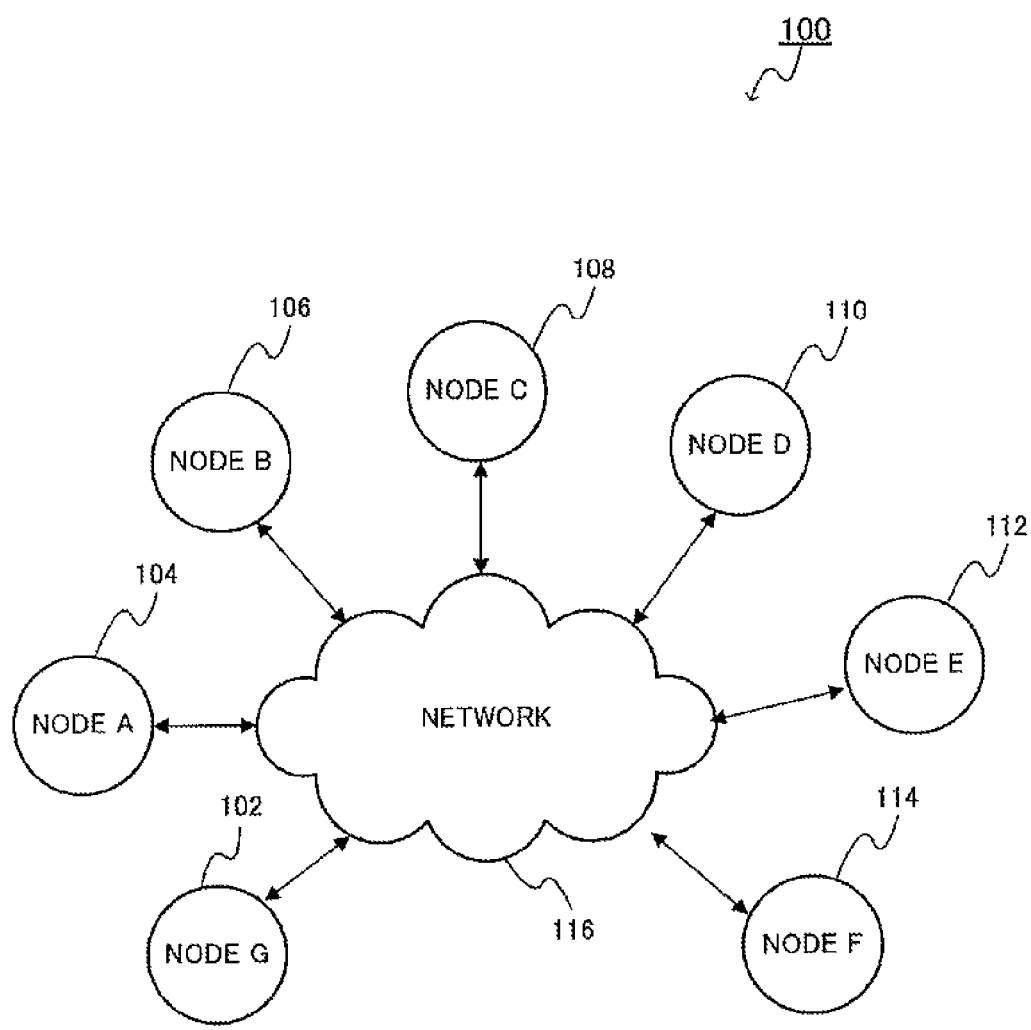
FIG. 1 is a system configuration diagram showing a configuration example of a network system according to an embodiment of the present invention.

FIG. 1 is an example of a configuration diagram of a network system to be managed by a network delay estimation apparatus according to an embodiment of the present invention.

As shown in FIG. 1, network system 100 includes, for example, node A to node G 102 to 114. These nodes are physical nodes connected to network 116 respectively. Although not shown in the figure, other physical nodes can also exist in network 116. Here, suppose paths exist between each node and all other, nodes for simplicity of explanation, but the present invention is not limited to this. A network delay estimation apparatus may be provided for any one node or provided for an apparatus (not shown) connected to network 116.

The present embodiment assumes that a metric tree acquired in the past is already stored in the network delay estimation apparatus as a current optimum tree.

Figure 2:
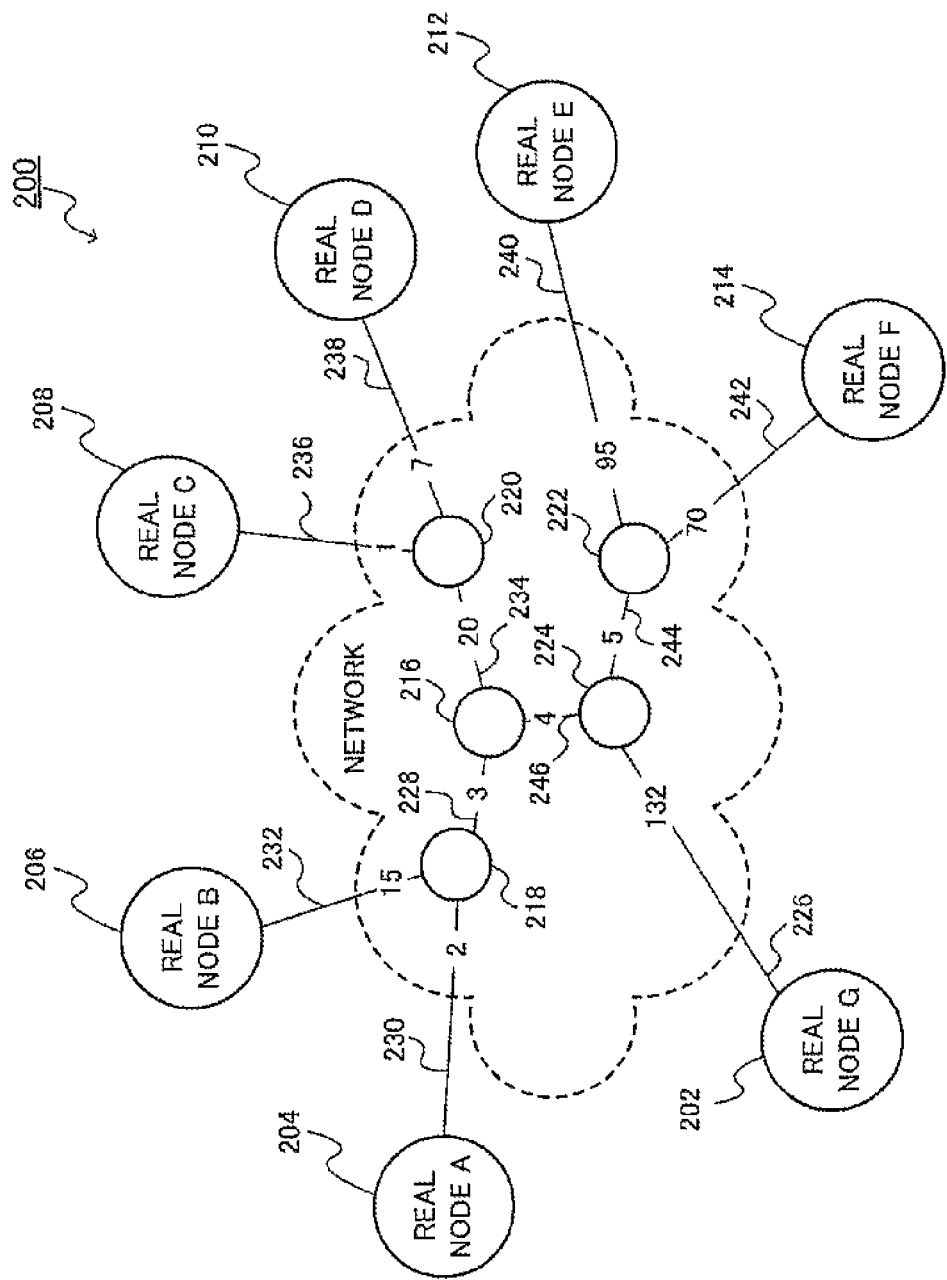
FIG. 2 is a diagram illustrating an example of contents of a current optimum tree stored in a network delay estimation apparatus according to the present embodiment.

FIG. 2 is a diagram illustrating an example of contents of a current optimum tree stored in the network delay estimation apparatus.

As shown in FIG. 2, current optimum tree 200 is an estimation of the current logical structure of network system 100 in FIG. 1. Current optimum tree 200 is made up, for example, of real nodes A to G 202 to 214, virtual nodes 216 to 224 and weighted edges 226 to 246 connecting these real nodes and virtual nodes.

Real nodes A to G 202 to 214 are elements corresponding to node A to node G in FIG. 1. Virtual nodes 216 to 224 are virtual elements inserted based on delays between real nodes. Weighted edges 226 to 246 are elements connecting the real nodes and virtual nodes and have their respective delay values. A delay between arbitrary two real nodes in current optimum tree 200 can be estimated with high accuracy by summing delay values of all edges between the real nodes. Furthermore, suppose real nodes A to G 202 to 214 are located at ends of current optimum tree 200.

A metric tree of the network after a new joining node is added can be obtained with the highest accuracy by measuring delays between the joining node and all other nodes, but this involves an enormous processing time and processing load as described above. However, when delays are measured by selecting some real nodes, it is problematic which real node should be selected as a measurement target node as described above.

Thus, the network delay estimation apparatus according to the present embodiment (hereinafter simply referred to as "network delay estimation apparatus") carefully selects real nodes and measures delays only about selected real nodes (nodes to be measured). This allows the network delay estimation apparatus to construct an optimum tree with high accuracy in a short processing time and with a low processing load.

Here, an overview of a method of constructing an optimum tree by the network delay estimation apparatus will be described. A construction of an optimum tree is namely to determine a virtual node to which a joining node is connected, determine a delay between the joining node and the virtual node and reflect the determination result in the current optimum tree.

Roughly speaking, the network delay estimation apparatus performs selection of first-round measurement target nodes, first-round measurement of delays, selection of second-round measurement target nodes, second-round measurement of delays and determination of connection nodes in this order.

FIG. 3 is a diagram illustrating an overview of selection of first-round measurement target nodes.

Figure 3A:
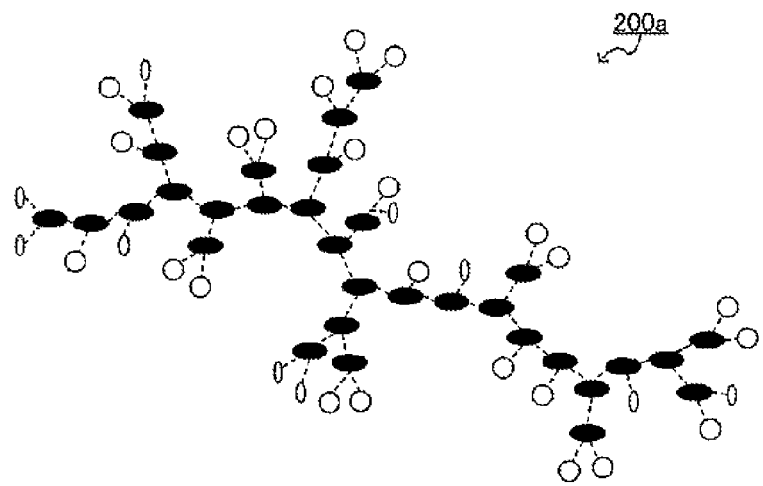
FIG. 3 is a diagram illustrating an overview of selection of first-round measurement target nodes according to the present embodiment.
Figure 3B:
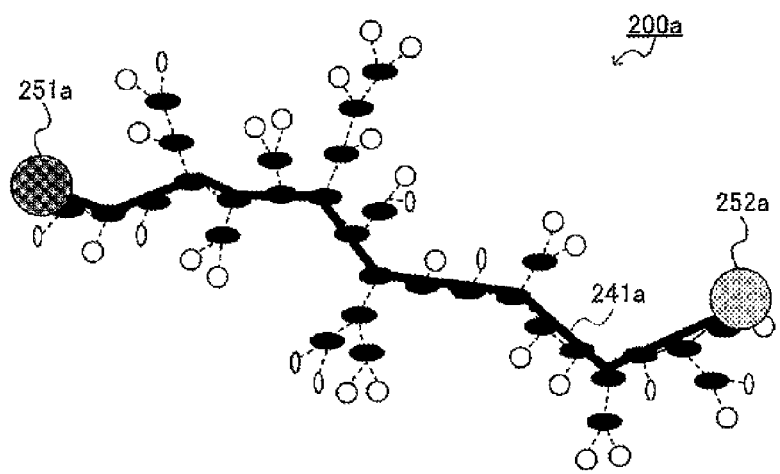
Figure 3C:
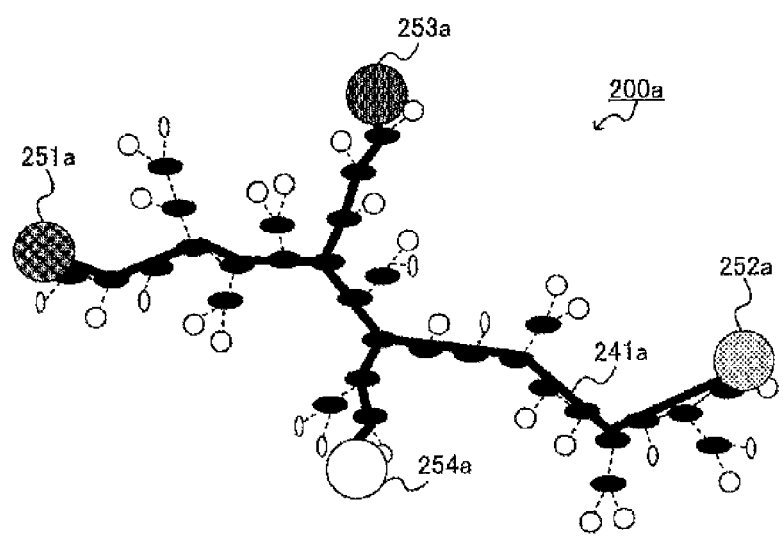

Suppose a case where metric tree 200a as shown in FIG. 3A is a current optimum tree. In this case, as shown in FIG. 3B, the network delay estimation apparatus selects first node 251a and second node 252a located at both ends of path 241a, which is the longest path, as a pair of primary first-round measurement target nodes. The network delay estimation apparatus further selects third node 253a whose distance from path 241a is the longest and fourth node 254a whose distance from path 241a is the next longest respectively as shown in FIG. 3(C). The network delay estimation apparatus then assumes selected third node 253a and fourth node 254a as nodes subject to secondary first-round measurement.

The network delay estimation apparatus then measures delays between a joining node and each of first-round measurement target nodes 251a to 254a. The network delay estimation apparatus then selects second-round measurement target nodes based on the measurement results.

FIG. 4 is a diagram illustrating an overview of selection of second-round measurement target nodes.

Figure 4A:
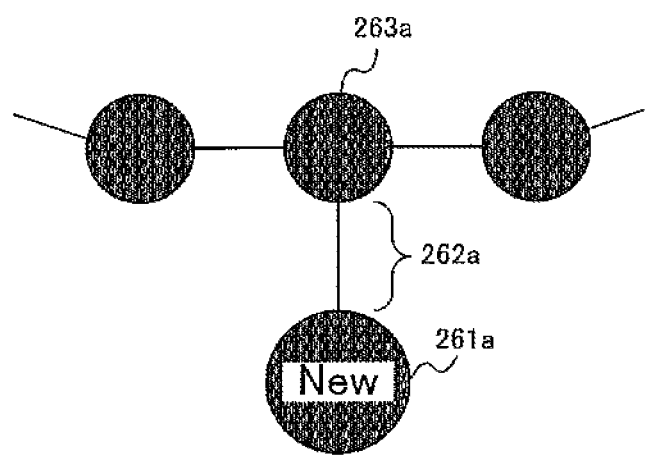
FIG. 4 is a diagram illustrating an overview of selection of second-round measurement target nodes according to the present embodiment.

First, as shown in FIG. 4A, the network delay estimation apparatus sets virtual connection node 263a at a position where distance 262a from joining node 261a is shortest based on the above measurement results. This virtual connection node 263a may be an existing virtual node or a newly created virtual node if an appropriate virtual node does not exist.

Figure 4B:
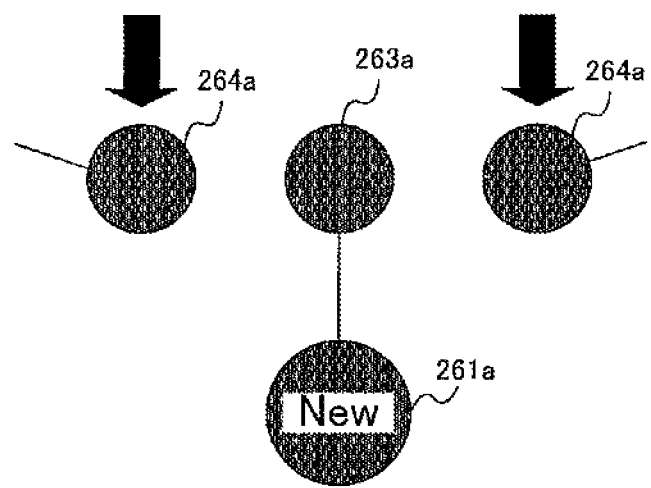

As shown in FIG. 4B, the network delay estimation apparatus then selects two real nodes 264a adjacent to virtual connection node 263a on each side of virtual connection node 263a as second-round measurement target nodes.

The network delay estimation apparatus then measures a delay between joining node 261a and each second-round measurement target node 264a. The network delay estimation apparatus then selects second-round measurement target node 264a whose delay with respect to joining node 261a is the smallest from among second-round measurement target nodes 264a as a measurement target node of joining node 261a based on the measurement result.

In order to estimate nodes near the joining node with higher accuracy, it is preferable to use results of delay measurements performed with respect to the farthest possible node. For this reason, as described above, the network delay estimation apparatus selects the nodes at both ends of the longest path as the primary first-round measurement target nodes and further selects nodes located far from this path as nodes subject to secondary first-round measurement. Through such processing, the network delay estimation apparatus can estimate nodes near the joining node with high accuracy, and can thereby construct an optimum tree with high accuracy and in a short time.

Next, the configuration of the network delay estimation apparatus will be described.

Figure 5:
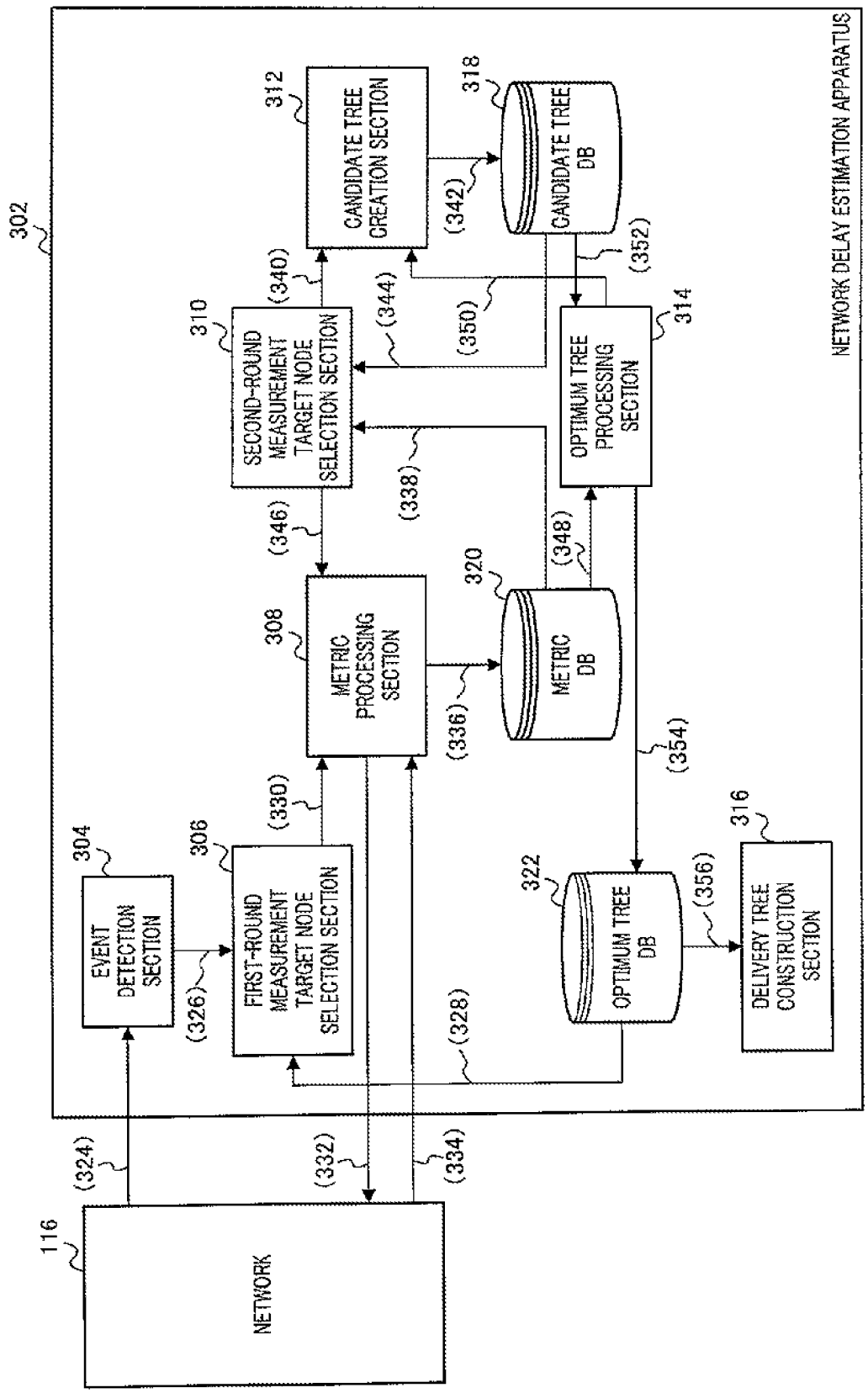
FIG. 5 is a block diagram illustrating a configuration example of a network delay estimation apparatus according to the present embodiment.

FIG. 5 is a block diagram showing a configuration example of the network delay estimation apparatus.

In FIG. 5, network delay estimation apparatus 302 includes event detection section 304, first-round measurement target node selection section 306, metric processing section 308, second-round measurement target node selection section 310, candidate tree creation section 312, optimum tree processing section 314, delivery tree construction section 316, candidate tree database (DB) 318, metric database (DB) 320, and optimum tree database (DB) 322.

Event detection section 304 detects the occurrence of a network event that causes network delay estimation apparatus 302 to start operating. This network event is transmitted from a joining node when it joins a network and is reception of a message including a network ID (identifier) of the joining node (324). Upon receiving the message, event detection section 304 passes the network ID included in the message to first-round measurement target node selection section 306 (326).

First-round measurement target node selection section 306 preferentially selects a pair of real nodes located at a longer distance from each other from the current optimum tree stored in optimum tree database 322 as first-round measurement target nodes based on an advance evaluation. Furthermore, first-round measurement target node selection section 306 evaluates distances of all other unselected nodes (hereinafter referred to as "unselected nodes") from the above-described pair of real nodes and searches long-distance unselected nodes. First-round measurement target node selection section 306 also selects the searched unselected nodes as first-round measurement target nodes (328).

To be more specific, first-round measurement target node selection section 306 repeats this selection until a predetermined completion condition is satisfied, for example, nodes of a predetermined proportion (e.g., ⅛, here four real nodes) among all nodes are selected as first-round measurement target nodes. The completion condition may also be set based on the user's priority items (accuracy or measurement time). The accuracy of a newly created optimum tree improves if the completion condition is defined to be a selection of nodes of a high proportion, but the processing load required until an optimum tree is created increases and the processing time is extended.

When the completion condition is satisfied (e.g., when four real nodes are selected as first-round measurement target nodes), first-round measurement target node selection section 306 instructs metric processing section 308 to start first-round metric collection (330). The "first-round metric collection" refers to measurement of a network metric between a joining node and each first-round measurement target node and collection of measurement results.

Metric processing section 308 acquires necessary network metrics from network 116 according to instructions from other function sections and stores the network metrics in metric database 320.

To be more specific, upon receiving an instruction from first-round measurement target node selection section 306, metric processing section 308 transmits a network message requesting measurement of a delay with respect to each first-round measurement target node to the joining node (332). Metric processing section 308 stores the first-round delay measurement result returned from the joining node (334) in metric database 320 as metric data (336).

Furthermore, upon receiving an instruction from second-round measurement target node selection section 310, which will be described later, metric processing section 308 transmits a network message requesting measurement of a delay with respect to each first-round measurement target node to the joining node (332). Metric processing section 308 then stores data of the second-round delay measurement result returned from the joining node in metric database 320 as metric data (336).

Figure 6:
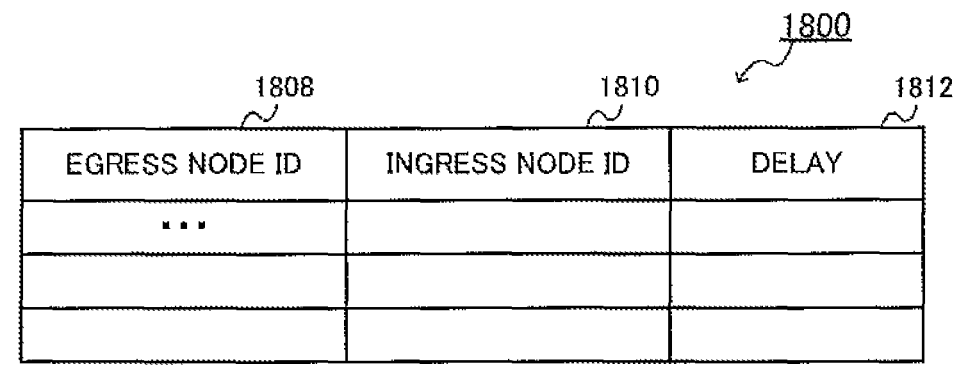

FIG. 6 is a diagram illustrating a configuration example of metric data stored in metric database 320.

As shown in FIG. 6, metric data 1800 describes egress node ID 1808, ingress node ID 1810 and delay 1812. in association with each other. Egress node ID 1808 describes a network ID of a joining node. Ingress node ID 1810 describes a network ID of a measurement target node. Delay 1812 describes a transmission delay from the node (joining node) indicated by egress node ID 1808 to the node (measurement target node) indicated by ingress node ID 1810 for each combination thereof.

Every time all new first-round delay measurement results are stored in metric database 320, second-round measurement target node selection section 310 passes the first-round delay measurement results to candidate tree creation section 312. In this way, second-round measurement target node selection section 310 instructs candidate tree creation section 312 to create a candidate tree (338, 340). The candidate tree is a temporary metric tree in which the joining node is added to the current optimum tree at an estimated connection position. Second-round measurement target node selection section 310 then evaluates errors from delay measured values of all candidate trees stored by candidate tree creation section 312 in candidate tree database 318. This causes second-round measurement target node selection section 310 to search candidate trees containing fewer errors with respect to the delay measured values (344).

Second-round measurement target node selection section 310 ranks candidate trees, from best to worst according to the evaluation result and extracts measurement target nodes of the corresponding round for each candidate tree in order starting from the best one.

Second-round measurement target node selection section 310 repeats this extraction until a predetermined completion condition is satisfied, for example, nodes of a predetermined proportion among all nodes (e.g., ⅜) are selected as second-round measurement target nodes. When the completion condition is satisfied, second-round measurement target node selection section 310 passes the list of extracted second-round measurement target nodes to metric processing section 308 (346). As a result, as described above, the data of the second-round delay measurement result is stored in metric database 320 (336).

Candidate tree creation section 312 creates a candidate tree according to instructions from other function sections and stores data of the created candidate tree (hereinafter referred to as "candidate tree data") in candidate tree database 318 (342).

To be more specific, upon receiving an instruction from second-round measurement target node selection section 310, candidate tree creation section 312 calculates a relative position of a joining node with respect to the path connecting the pair for each pair of first-round measurement target nodes. Candidate tree creation section 312 then creates a tree when the joining node is connected to the current optimum tree at a position where the distance from the path is the shortest as a candidate tree.

Furthermore, upon receiving an instruction from optimum tree processing section 314, candidate tree creation section 312 creates a candidate tree again. In this case, candidate tree creation section 312 creates a candidate tree based on the network metric among all pairs of first-round measurement target nodes and all pairs of second-round measurement target nodes.

Upon receiving the processing of candidate tree creation section 312, candidate tree database 318 stores candidate tree data.

FIG. 7 is a diagram illustrating a configuration example of the candidate tree data stored in candidate tree database 318.

As shown in FIG. 7, candidate tree data 1700 describes tree ID 1708, node ID 1710 and type 1712 of each node of the candidate tree in association with each other. Furthermore, candidate tree data 1700 also describes tree ID 1720, egress node 1722, ingress node 1724 and distance 1726 regarding each edge of the candidate tree in association with each other. Type 1712 of the node describes information indicating whether the node is a real node or a virtual node. Furthermore, distance 1726 of the edge describes a distance between the node indicated by egress node 1722 and the node indicated by ingress node 1724.

The candidate tree data stored in candidate tree database 318 is used by second-round measurement target node selection section 310 to select a second-round measurement target node.

Every time all of the new first-round delay measurement results and the second-round delay measurement results are stored in metric database 320, optimum tree processing section 314 instructs candidate tree creation section 312 to create a candidate tree (348, 350). As a result, as described above, a candidate tree created based on the second-round measurement target node is stored in candidate tree database 318 (342). Optimum tree processing section 314 evaluates all candidate trees based on the delay measurement result (network metric) between the joining node and each measurement target node (352) and determines the optimum candidate tree as an optimum tree. Optimum tree processing section 314 then stores data of the determined optimum tree (hereinafter referred to as "optimum tree data") in optimum tree database 322 (354).

FIG. 8 is a diagram illustrating a configuration example of optimum tree data stored in optimum tree database 322.

As shown in FIG. 8, optimum tree data 1900 describes node ID 1908 and type 1910 of each node of the optimum tree in association with each other. Furthermore, optimum tree data 1900 describes egress node 1918, ingress node 1920 and distance 1922 regarding each edge of the candidate tree in association with each other. Type 1910 of the node describes information indicating whether the node is a real node or a virtual node. Furthermore, distance 1922 of the edge describes a distance between the node indicated by egress node 1918 and the node indicated by ingress node 1920.

Upon receiving an inquiry about a delay of an arbitrary section through an operation by the operator or the like, delivery tree construction section 316 acquires the delay of the inquired section from the optimum tree data of optimum tree database 322.

Furthermore, although not shown, network delay estimation apparatus 302 includes, for example, CPU (central processing unit), storage medium storing a control program such as ROM (read only memory), work memory such as RAM (random access memory) and communication circuit or the like. In this case, the functions of the above-described sections are realized by the CPU executing the control program.

Such network delay estimation apparatus 302 can construct an optimum tree by narrowing down targets of measurement of a delay from the joining node only to the first-round measurement target nodes and second-round measurement target nodes.

Next, operation of network delay estimation apparatus 302 will be described.

Figure 9:
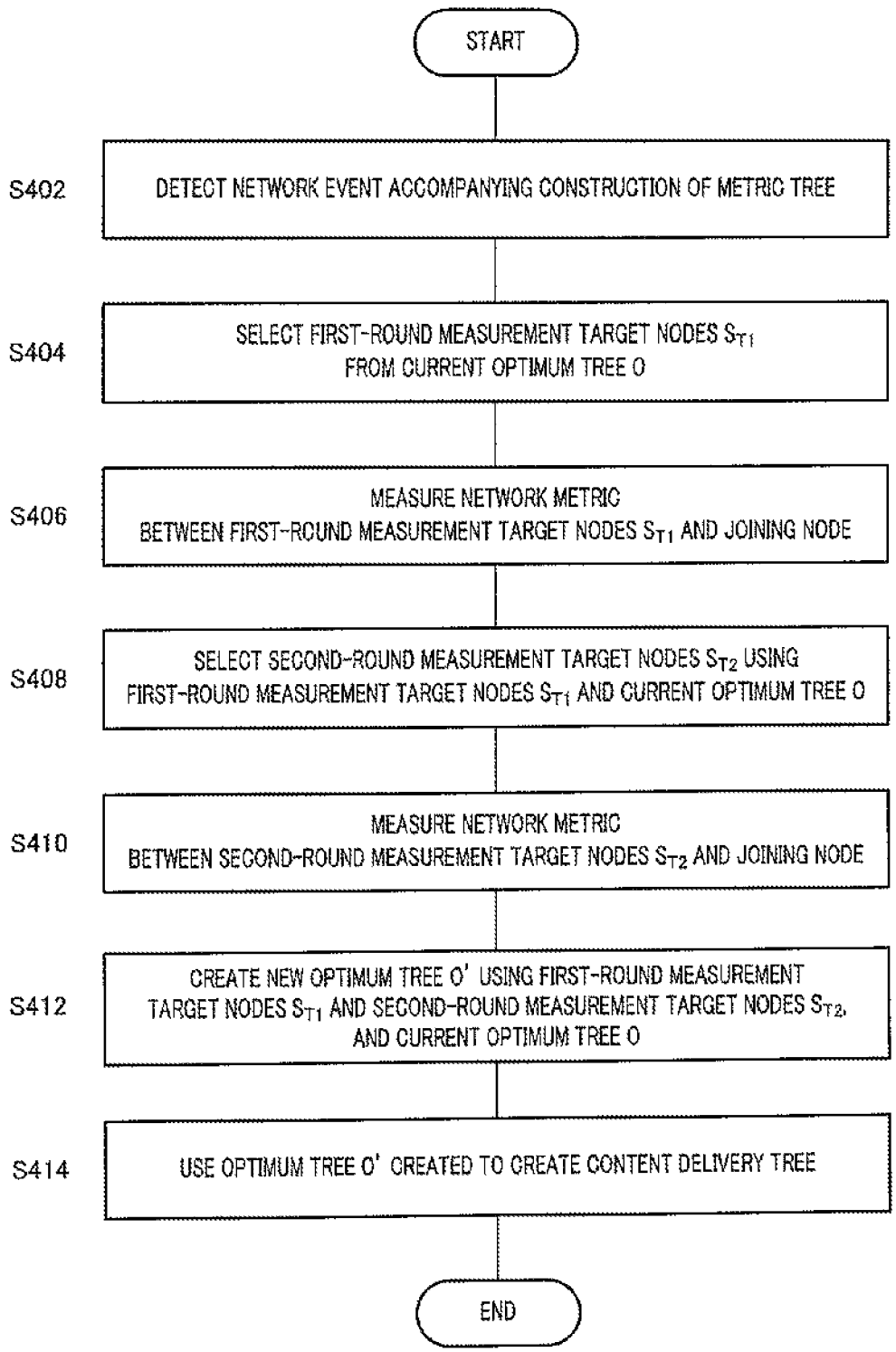
FIG. 9 is a flowchart illustrating an overall operation of the network delay estimation apparatus according to the present embodiment.

FIG. 9 is a flowchart indicating overall operation of network delay estimation apparatus 302.

First, event detection section 304 detects a network event accompanying the construction of a metric tree (receiving a network message from the joining node) (S402). First-round measurement target node selection section 306 then selects first-round measurement target node $S_{T1}$ from current optimum tree O (S404). Details of the processing of selecting this first-round measurement target node $S_{T1}$ will be described later. When first-round measurement target node $S_{T1}$ is selected, metric processing section 308 transmits a network message including a list of network IDs of first-round measurement target node $S_{T1}$ to the joining node. Thus, metric processing section 308 requests the joining node to measure a network metric (delay) with respect to each first-round measurement target node $S_{T1}$ (S406).

Figure 10:
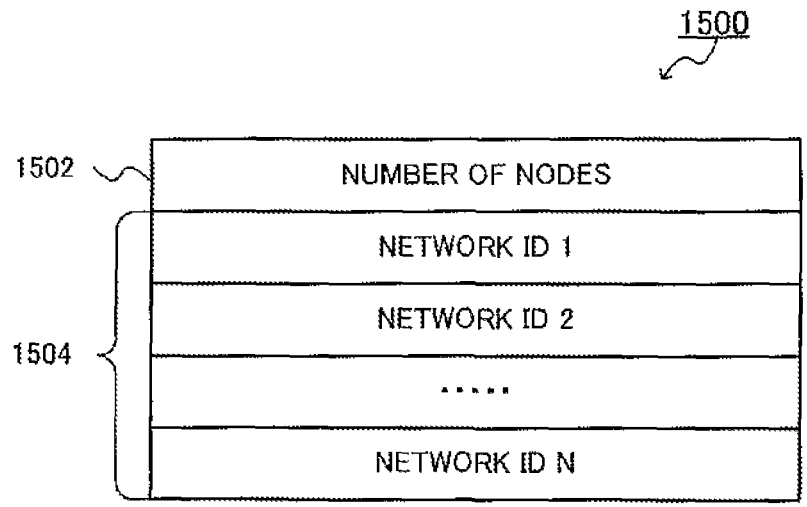
FIG. 10 is a diagram illustrating a configuration example of a network message according to the present embodiment.

FIG. 10 is a diagram illustrating a configuration example of a network message.

As shown in FIG. 10, network message 1500 describes number of nodes 1502 and network ID list 1504. Network ID list 1504 is a list of network IDs of all selected first-round measurement target nodes $S_{T1}$. Number of nodes 1502 is the number of nodes that network ID list 1504 covers, that is, the number of network IDs described in list 1504.

Figure 11:
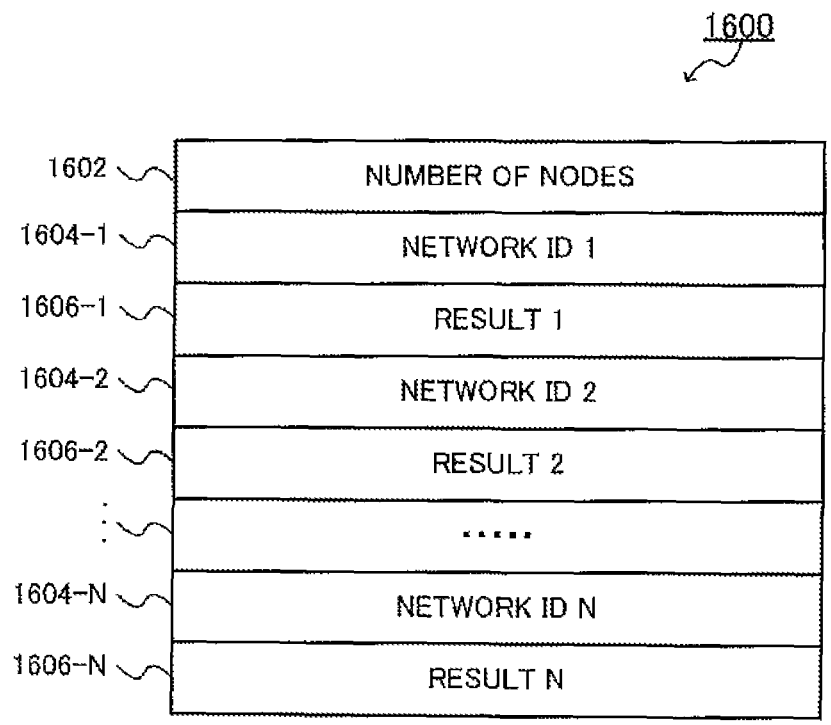
FIG. 11 is a diagram illustrating a configuration example of network metric measurement results according to the present embodiment.

FIG. 11 is a diagram illustrating a configuration example of network metric measurement results.

As shown in FIG. 11, measurement result 1600 describes number of nodes 1602, and pairs of network ID 1604 and result 1606 of the node. Network IDs 1604 correspond to network IDs listed in network message 1500.

Metric processing section 308 stores all first-round measurement results in metric database 320. Second-round measurement target node selection section 310 selects second-round measurement target nodes $S_{T2}$ using first-round measurement target nodes $S_{T1}$ and current optimum tree O (S408). Details of the processing of selecting this second-round measurement target nodes $S_{T2}$ will be described later. Once the list of second-round measurement target nodes $S_{T2}$ is acquired, metric processing section 308 transmits a network message including the network ID list of second-round measurement target nodes $S_{T2}$ to the joining node. Thus, metric processing section 308 requests the joining node to measure a network metric (delay) with respect to each second-round measurement target node $S_{T2}$ (S410).

Metric processing section 308 then stores all the second-round measurement results in metric database 320. Optimum tree processing section 314 then creates new optimum tree O' using first-round measurement target node $S_{T1}$ and second-round measurement target node $S_{T2}$ and current optimum tree O (S412). Optimum tree O' is a new optimum tree including the joining node. Details of the processing of creating this new optimum tree O' will be described later. When created optimum tree O' is stored in optimum tree database 322, delivery tree construction section 316 uses optimum tree O' to create a tree for a content delivery as appropriate (S414).

Details of each process in FIG. 9 will be described.

Figure 12:
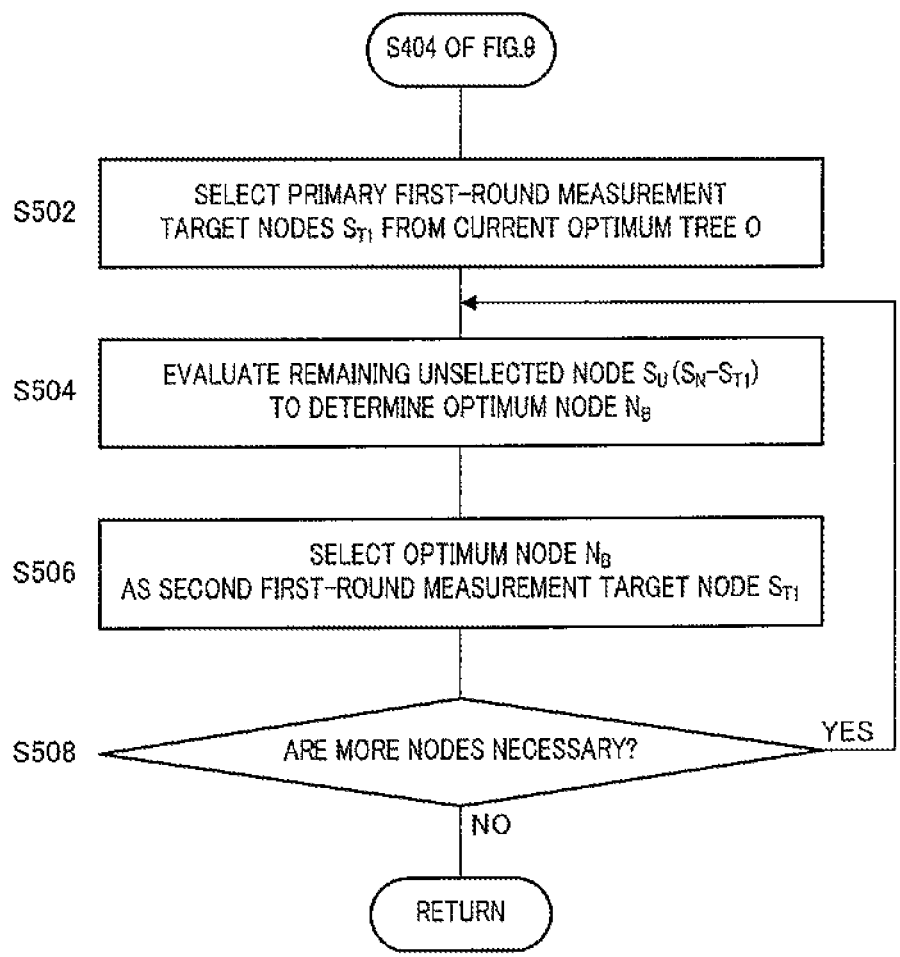
FIG. 12 is a flowchart illustrating details of the processing of selection of first-round measurement target nodes according to the present embodiment.

FIG. 12 is a flowchart illustrating details of the processing of selecting first-round measurement target nodes in step S404 of FIG. 9.

First-round measurement target node selection section 306 selects a pair of real nodes having the longest distance from each other in current optimum tree O as primary first-round measurement target nodes $S_{T1}$ (S502). First-round measurement target node selection section 306 then evaluates remaining unselected nodes $S_U$ and determines optimum node (node located at a long distance from the path connecting the pair of primary first-round measurement target nodes $S_{T1}$) $N_B$ (S504). Details of the processing of selecting primary first-round measurement target nodes $S_{T1}$ and details of the processing of determining optimum node $N_B$ will be described later. The "unselected nodes" are remaining real nodes after excluding first-round measurement target nodes $S_{T1}$ from all real nodes $S_N$ in current optimum tree O.

First-round measurement target node selection section 306 then selects determined optimum node $N_B$ as secondary first-round measurement target nodes $S_{T1}$ and adds this to the set of first-round measurement target nodes $S_{T1}$ (S506). First-round measurement target node selection section 306 repeats the processes in steps S504 and S506 until the number of first-round measurement target nodes $S_{T1}$ reaches a required number (S508). According to the present embodiment, since the predetermined number is four (see FIG. 3A), a pair of primary first-round measurement target nodes is selected in step S502 and a pair of secondary first-round measurement target nodes is selected in step S504.

Figure 13:
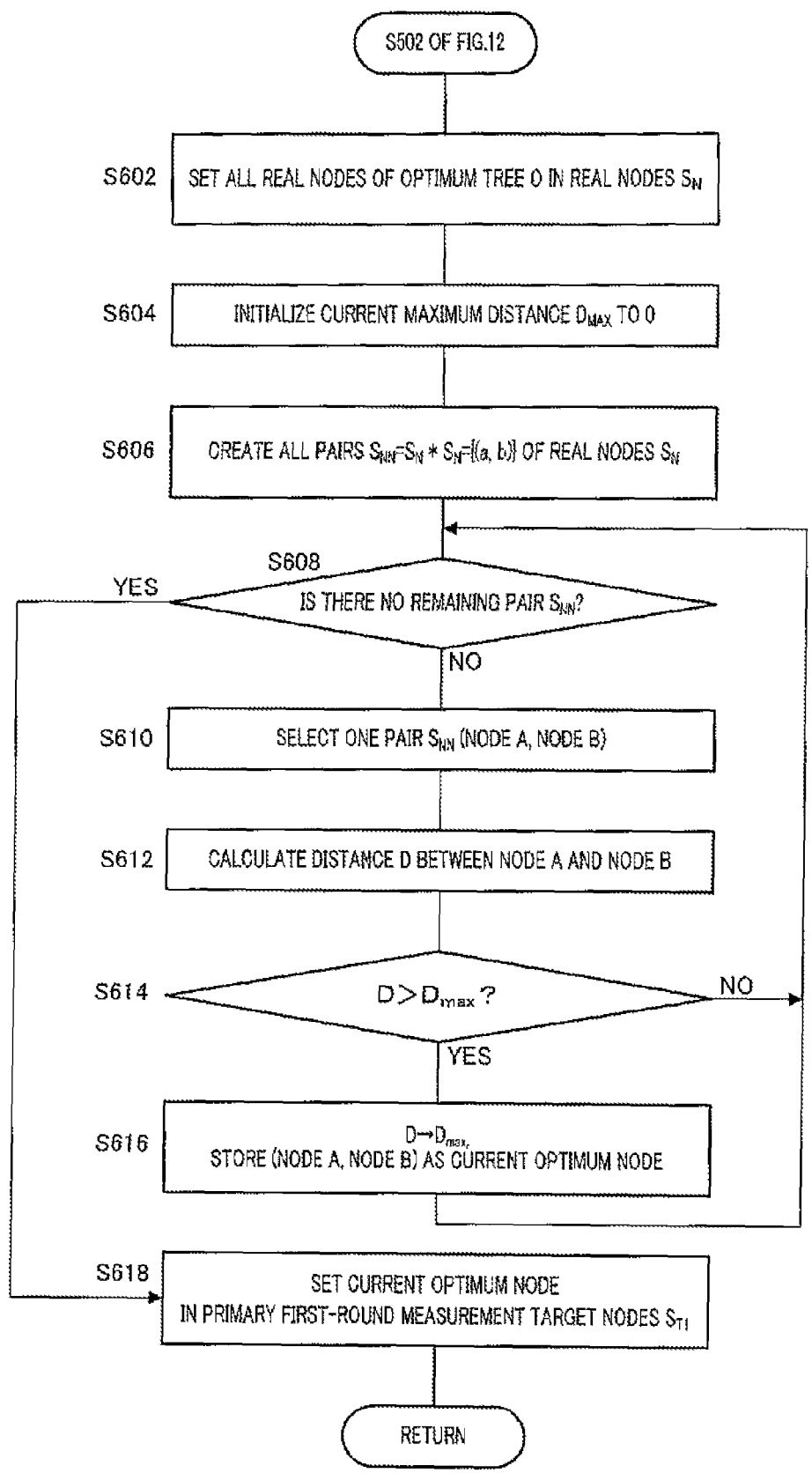
FIG. 13 is a flowchart illustrating details of the processing of setting of primary first-round measurement target nodes according to the present embodiment.

FIG. 13 is a flowchart illustrating details of the processing of setting primary first-round measurement target nodes in step S502 of FIG. 12.

First-round measurement target node selection section 306 sets all real nodes in current optimum tree O in real nodes $S_N$ first (S602). First-round measurement target node selection section 306 then initializes to 0 maximum distance $D_{max}$ used as a parameter to compare the distance between nodes (S604) and creates a set of all pairs $S_{NN}$ of real nodes $S_N$ (S606). Pair $S_{NN}$ is a combination $(S_N*S_N=\{(a, b)\}$ of real nodes $S_N$ and other real nodes $S_N$. The processes in steps S610 to S616 below will be repeated while unprocessed pairs $S_{NN}$ remain (S608).

First, first-round measurement target node selection section 306 selects one pair $S_{NN}$ (S610) and calculates distance D between node A and node B of selected pair $S_{NN}$ based on current optimum tree O (S612). When calculated distance D is greater than maximum distance $D_{max}$ (S614: YES), first-round measurement target node selection section 306 then stores this distance D as maximum distance $D_{max}$. Furthermore, first-round measurement target node selection section 306 stores selected pair $S_{NN}$ as the current optimum node (S616). First-round measurement target node selection section 306 then checks all pairs $S_{NN}$ and then sets an optimum node at that point in time in primary first-round measurement target nodes $S_{T1}$ (S618).

Figure 14:
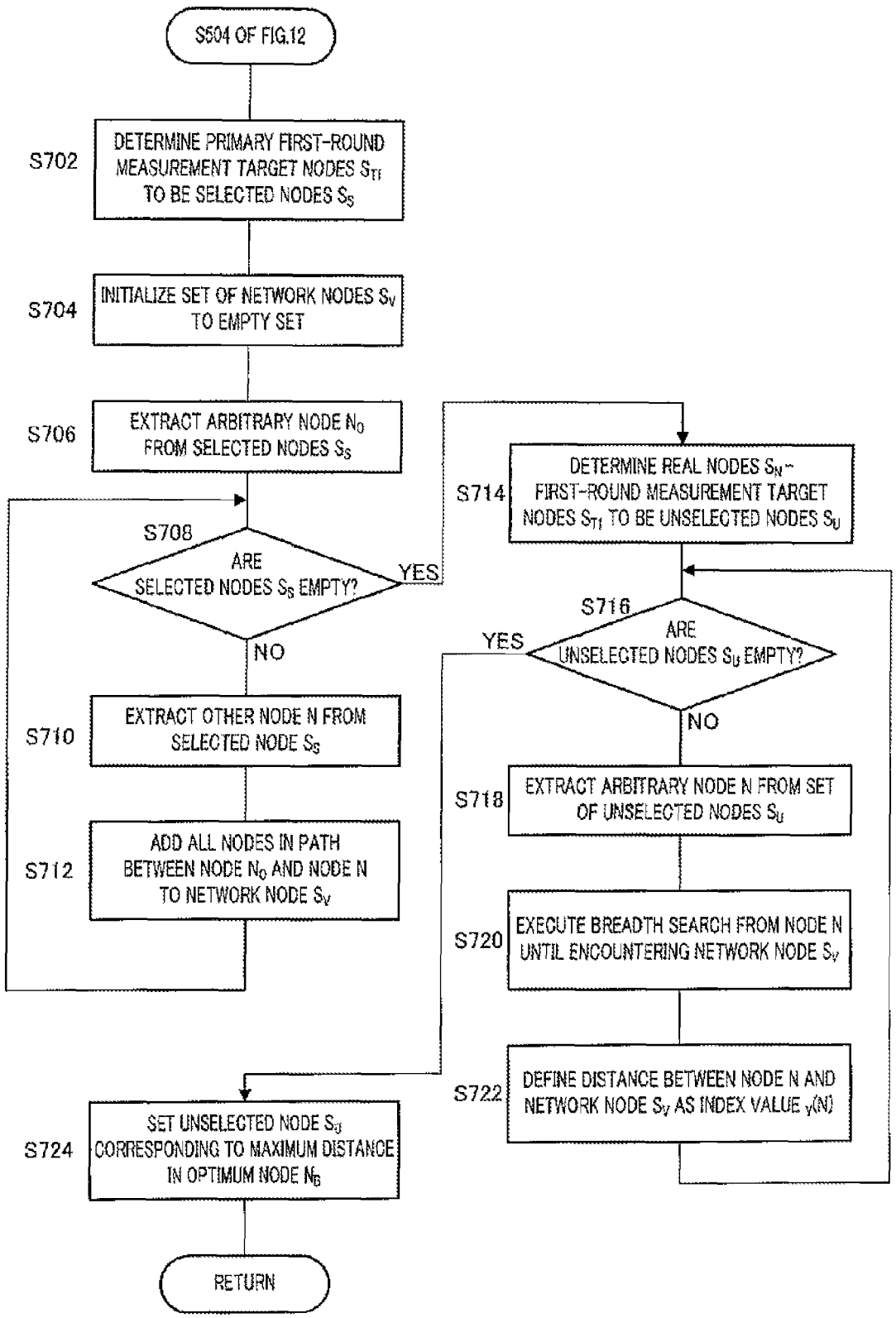
FIG. 14 is a flowchart illustrating details of the processing of determining an optimum node according to the present embodiment.

FIG. 14 is a flowchart showing details of the processing of determining an optimum node in step S504 of FIG. 12.

First-round measurement target node selection section 306 assumes first-round measurement target nodes $S_{T1}$ at that point in time as initially selected nodes $S_S$ first (S702). That is, the initial state of selected nodes $S_S$ is made up of primary first-round measurement target nodes $S_{T1}$ only. Furthermore, first-round measurement target node selection section 306 initializes network node $S_V$ for forming a network to be empty (S704). First-round measurement target node selection. section 306 then extracts one arbitrary node $N_0$ from the set of select nodes $S_S$ (S706) and repeats the processes in following steps S710 and 5712 while unprocessed nodes remain (S708). First-round measurement target node selection section 306 extracts one of other nodes N which are the remainder of selected nodes $S_S$ (S710). First-round measurement target node selection section 306 then calculates a path between node No and node N in current optimum tree O and adds all nodes in the path to the set of network nodes $S_V$ (S712).

When all selected nodes $S_S$ are processed, first-round measurement target node selection section 306 starts evaluating unselected nodes $S_U$ using the set of network nodes $S_V$. First, first-round measurement target node selection section 306 assumes the node remaining after excluding all first-round measurement target nodes $S_{T1}$ from the set of real nodes $S_N$ as unselected nodes $S_U$ (S714). First-round measurement target node selection section 306 then repeats the processes in following steps S718 to 722 while unprocessed unselected nodes $S_U$ remain (S716).

First-round measurement target node selection section 306 extracts one arbitrary node N from unselected nodes $S_U$ (S718) and performs a breadth search from node N in current optimum tree O until any one of network nodes $S_V$ is reached (S720). First-round measurement target node selection section 306 then defines a distance from network node $S_V$ which encounters node N as index value v(N) of node N thereof (S722). First-round measurement target node selection section 306 then sets a node whose index value v(N) becomes a maximum among all nodes N in optimum node $N_B$ (S724). That is, first-round measurement target node selection section 306 sets a node whose distance from network node $S_V$ becomes a maximum and a node whose distance from the path connecting a pair of primary first-round measurement target nodes $S_{T1}$ is the longest in optimum node $N_B$.

Figure 15:
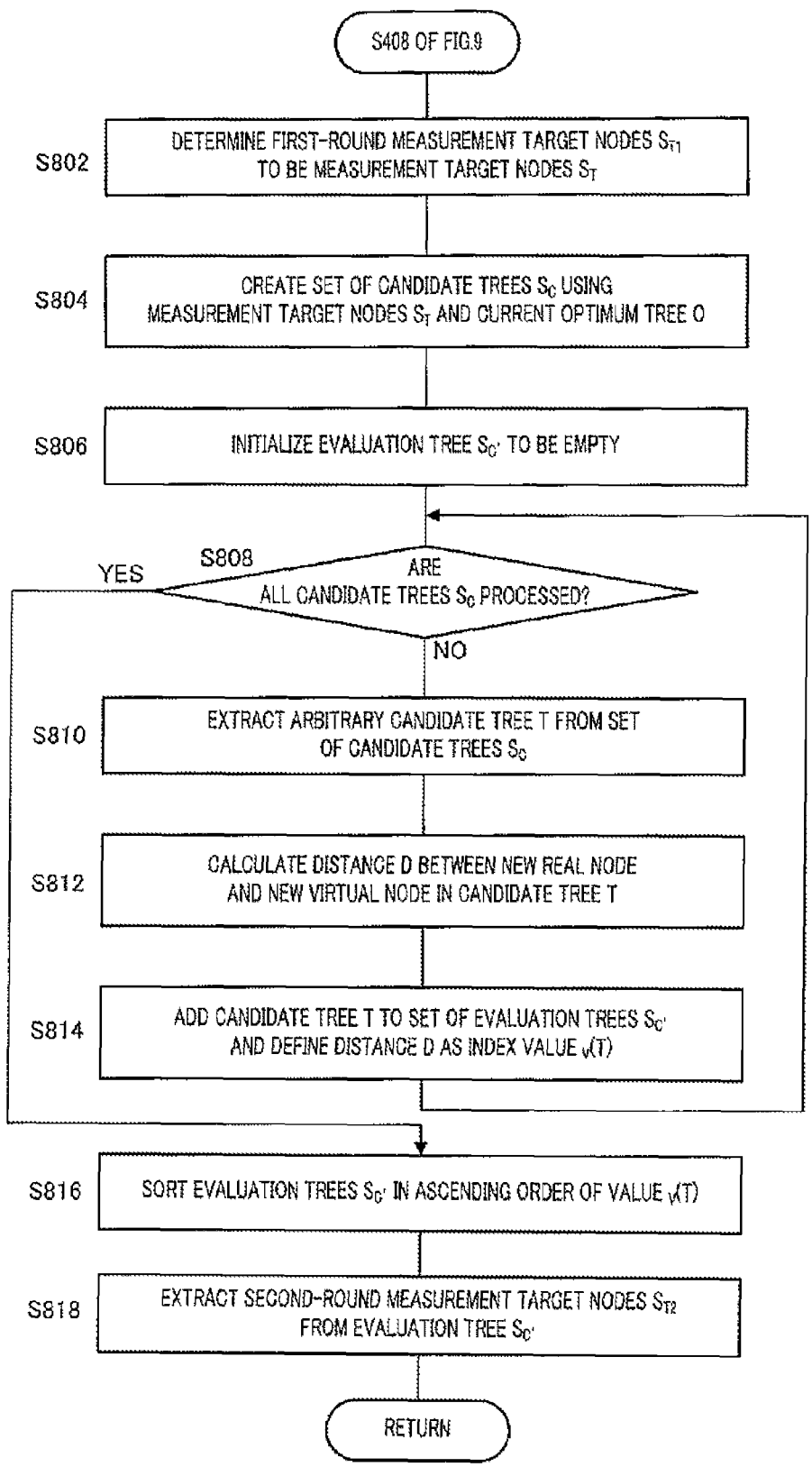
FIG. 15 is a flowchart illustrating details of the processing of selection of second-round measurement target nodes according to the present embodiment.

FIG. 15 is a flowchart showing details of the processing of selecting second-round measurement target nodes in step S408 of FIG. 9.

Second-round measurement target node selection section 310 determines first-round measurement target nodes $S_{T1}$ to be measurement target nodes $S_T$ first (S802). That is, the initial state of the set of measurement target nodes $S_T$ is made up of only primary first-round measurement target nodes $S_{T1}$. Second-round measurement target node selection section 310 then creates a set of candidate trees $S_C$ using candidate tree creation section 312 (S804). Details of the processing of creating this set of candidate trees $S_C$ will be described later. Candidate tree $S_C$ is a metric tree when a pair of measurement target nodes $S_T$ (here, first-round measurement target nodes $S_{T1}$) is connected in optimum tree O. Furthermore, the set of candidate trees $S_C$ is a set of candidate trees $S_C$ for all pairs. Second-round measurement target node selection section 310 then extracts the set of candidate trees $S_C$ from candidate tree database 318 and evaluates each candidate tree $S_C$ as follows.

First, second-round measurement target node selection section 310 initializes evaluation tree $S_{C'}$ to be empty (S806). Second-round measurement target node selection section 310 then repeats the processes in following steps S810 to S814 while unprocessed candidate nodes $S_C$ remain (S808).

First, second-round measurement target node selection section 310 extracts one arbitrary candidate tree T from the set of candidate trees $S_C$ (S810). Second-round measurement target node selection section 310 then calculates distance D between a new real node (joining node) and a new virtual node (joining node connection position) in candidate tree T (S812). Second-round measurement target node selection section 310 then adds candidate tree T to evaluation tree $S_{C'}$ and defines distance D obtained as index value v(T) of candidate tree T thereof (S814). After evaluating all evaluation candidate trees $S_C$, second-round measurement target node selection section 310 sorts evaluation tree $S_{C'}$ in ascending order of index value v(T) (S816). Second-round measurement target node selection section 310 then extracts second-round measurement target nodes $S_{T2}$ from the set of evaluation tree $S_{C'}$ in the sorted order (S818). Details of this processing of extracting second-round measurement target nodes $S_{T2}$ will be described later.

Figure 16:
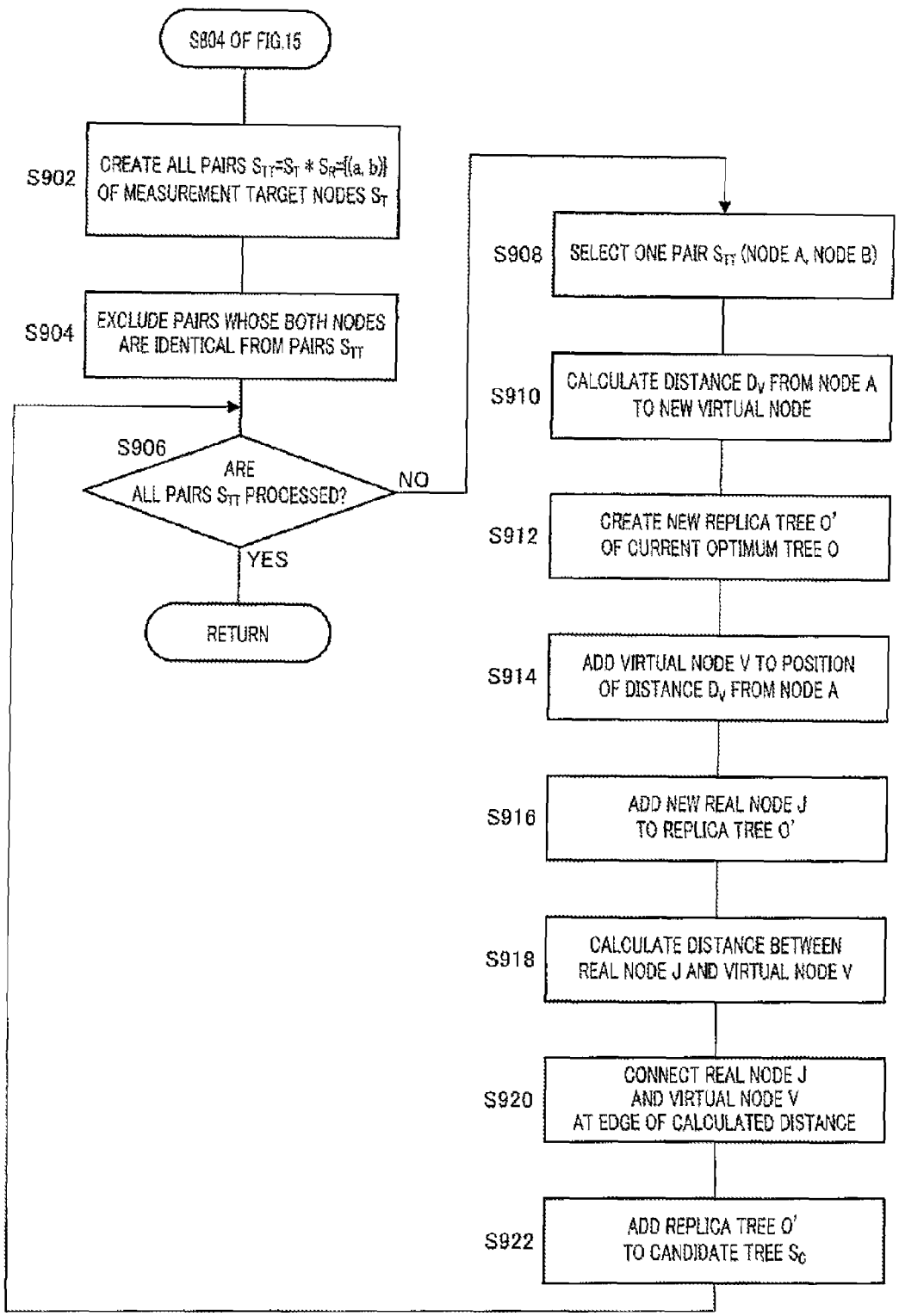
FIG. 16 is a flowchart illustrating details of the processing of creating a set of candidate trees according to the present embodiment.

FIG. 16 is a flowchart showing details of the processing of creating a candidate tree set in step S804 of FIG. 15.

Candidate tree creation section 312 creates all possible pairs $S_{TT}$ from among measurement target nodes $S_T$ first (S902) and excludes pairs in which both of the two nodes are the same from pair $S_{TT}$ (S904). Candidate tree creation section 312 repeats the processes in following steps S908 to 5922 while unprocessed pairs $S_{TT}$ remain (S906).

First, candidate tree creation section 312 selects one $S_{TT}$ pair (S908). Candidate tree creation section 312 then calculates distance $D_V$ from node A to a virtual node to be added out of node A and node B of selected pair $S_{TT}$ in current optimum tree O (S910). Distance $D_V$ calculated by candidate tree creation section 312 is a value indicating the position of a virtual node added to the path between pairs $S_{TT}$ as the joining node connection position. Candidate tree creation section 312 adds up a delay between $S_{TT}$'s (estimate value from current optimum tree O) and a delay (measured value) between node A and the joining node, and subtracts a delay (measured value) between node B and the joining node from this addition value. Candidate tree creation section 312 then calculates distance $D_V$ by dividing the subtraction result by 2.

Candidate tree creation section 312 then creates replica tree O' of current optimum tree O (S912) and adds new virtual node V to replica tree O' at the position of distance $D_V$ (S914). Details of the processing of adding this virtual node V will be described later. Candidate tree creation section 312 then creates new real node J corresponding to the joining node and adds it to replica tree O' (S916) and calculates a distance between virtual node V and real node J (S918). Candidate tree creation section 312 then connects real node J to virtual node V at the edge of the calculated distance (S920) and adds replica tree O' to candidate tree database 318 as candidate tree $S_C$ (S922).

Figure 17:
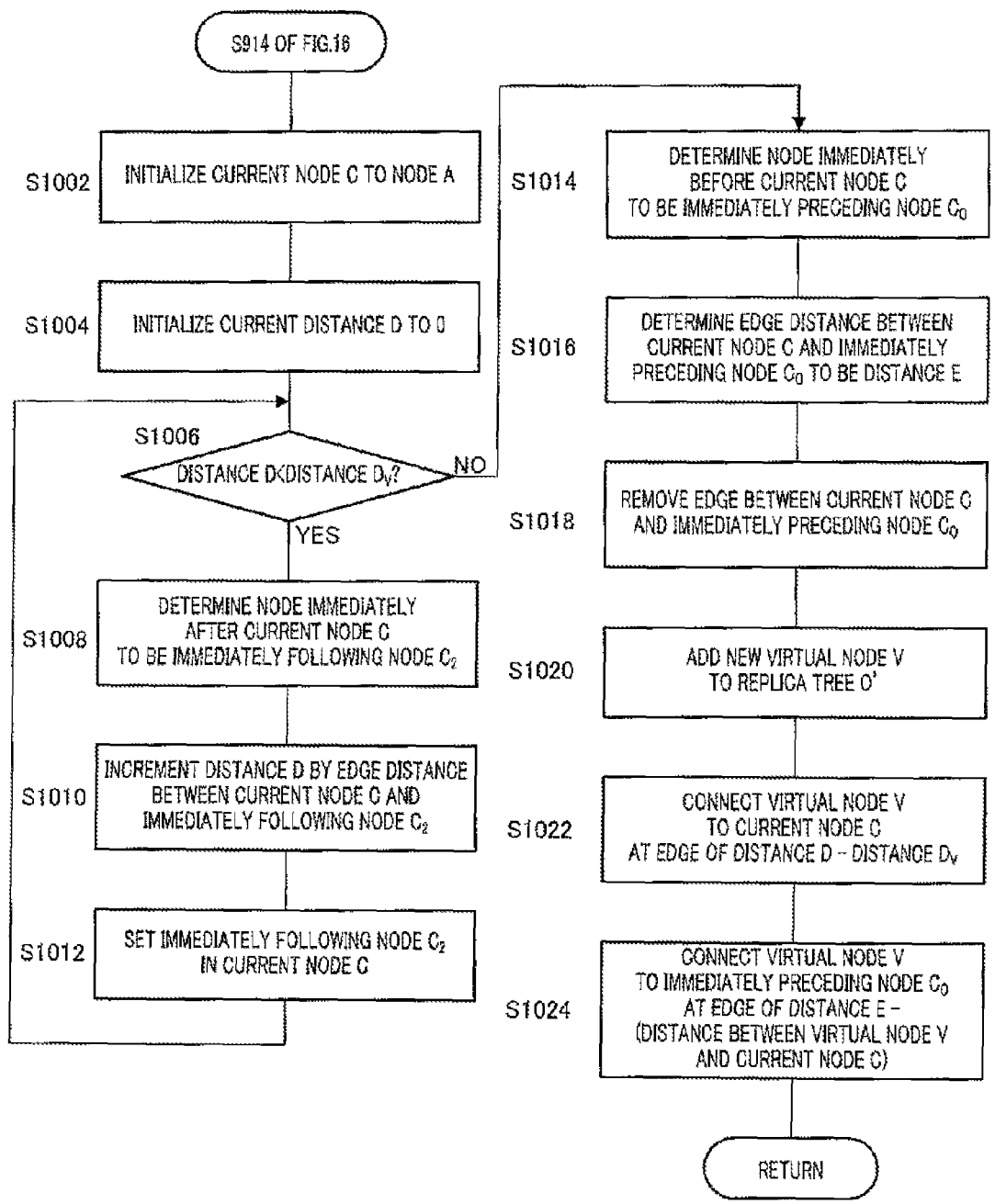
FIG. 17 is a flowchart illustrating details of the processing of adding a virtual node according to the present embodiment.

FIG. 17 is a flowchart showing details of the processing of adding a virtual node in step S914 of FIG. 16.

Candidate tree creation section 312 initializes current node C to node A first (S1002) and initializes current distance D to 0 (S1004). "Current node C" indicates a virtual node on replica tree O' subject to a determination as to whether or not it is near the position of a virtual node. Candidate tree creation section 312 then repeats the processes in following steps S1008 to S1012 while current distance D remains less than above-described distance $D_V$ which indicates the position of the virtual node (S1006: YES).

First, candidate tree creation section 312 determines a virtual node immediately after current node C located in a path between node A and node B to be immediately following node $C_2$ (S1008). Candidate tree creation section 312 then increments distance D by a distance between current node C and immediately following node $C_2$ (S1010) and then sets immediately following node $C_2$ in current node C (S1012).

When current distance D becomes equal to or above distance $D_V$ (S1006: NO), candidate tree creation section 312 determines the virtual node immediately before current node C located in the path between node A and node B to be immediately preceding node $C_0$ (S1014). Candidate tree creation section 312 then determines the distance between current node C and immediately preceding node $C_0$ to be distance E (S1016) and removes an edge between current node C and immediately preceding node $C_0$ (S1018). Candidate tree creation section 312 then creates new virtual node V and adds it to replica tree O' (S1020). Candidate tree creation section 312 then connects virtual node V to current node C at an edge corresponding to a difference between current distance D and above-described distance $D_V$ (S1022). Candidate tree creation section 312 then connects virtual node V to immediately preceding node $C_0$ at an edge corresponding to the difference between distance E and the distance between virtual node V and current node C (S1024).

Figure 18:
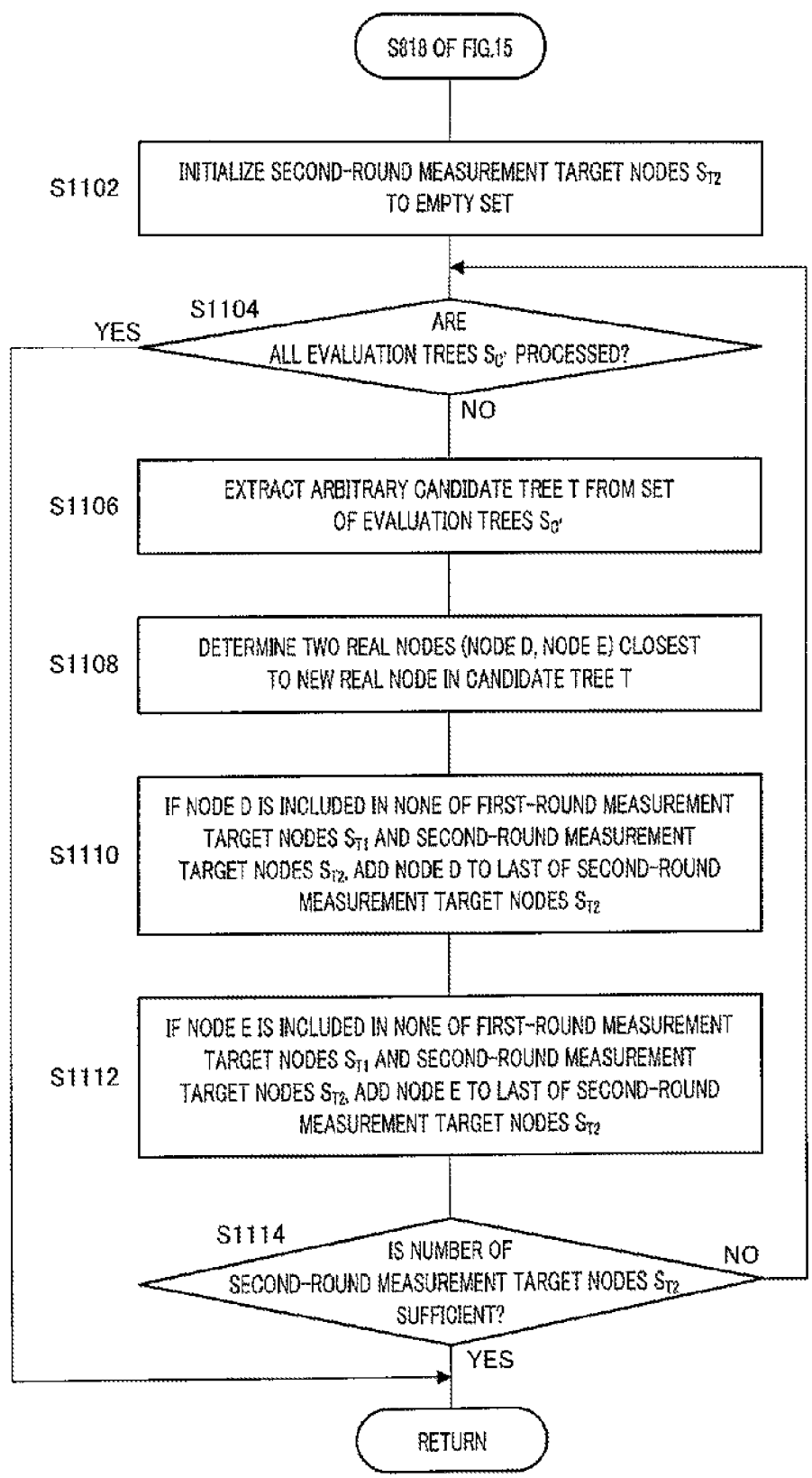
FIG. 18 is a flowchart illustrating details of the processing of extraction of second-round measurement target nodes according to the present embodiment.

FIG. 18 is a flowchart indicating details of the processing of extracting a second-round measurement target node in step S818 of FIG. 15.

Second-round measurement target node selection section 310 initializes second-round measurement target nodes $S_{T2}$ to be empty first (S1102). Second-round measurement target node selection section 310 then repeats the processes in following steps S1106 to S1114 while unprocessed evaluation trees $S_{C'}$ remain (S1104).

First, second-round measurement target node selection section 310 extracts one candidate tree T from among unprocessed evaluation trees $S_{C'}$ in the sorting order of above-described index value v(T) (S1106). Second-round measurement target node selection section 310 then determines two real nodes nearest to a new real node (joining node) as node D and node E in extracted candidate tree T (S1108). Second-round measurement target node selection section 310 then determines whether or not node D is included in the set of first-round measurement target nodes $S_{T1}$ and the set of second-round measurement target nodes $S_{T2}$. When node D is included in none of the sets, second-round measurement target node selection section 310 adds node D to the set of second-round measurement target nodes $S_{T2}$ (S1110). Similarly, second-round measurement target node selection section 310 determines whether or not node E is included in the set of first-round measurement target nodes $S_{T1}$ and the set of second-round measurement target nodes $S_{T2}$. When node E is included in none of the sets, second-round measurement target node selection section 310 adds node E to the set of second-round measurement target nodes $S_{T2}$ at the last position (S1112).

Second-round measurement target node selection section 310 then repeats the processes in steps S1106 to S1112 until the number of second-round measurement target nodes $S_{T2}$ reaches a predetermined value and becomes sufficient (S1114).

Figure 19:
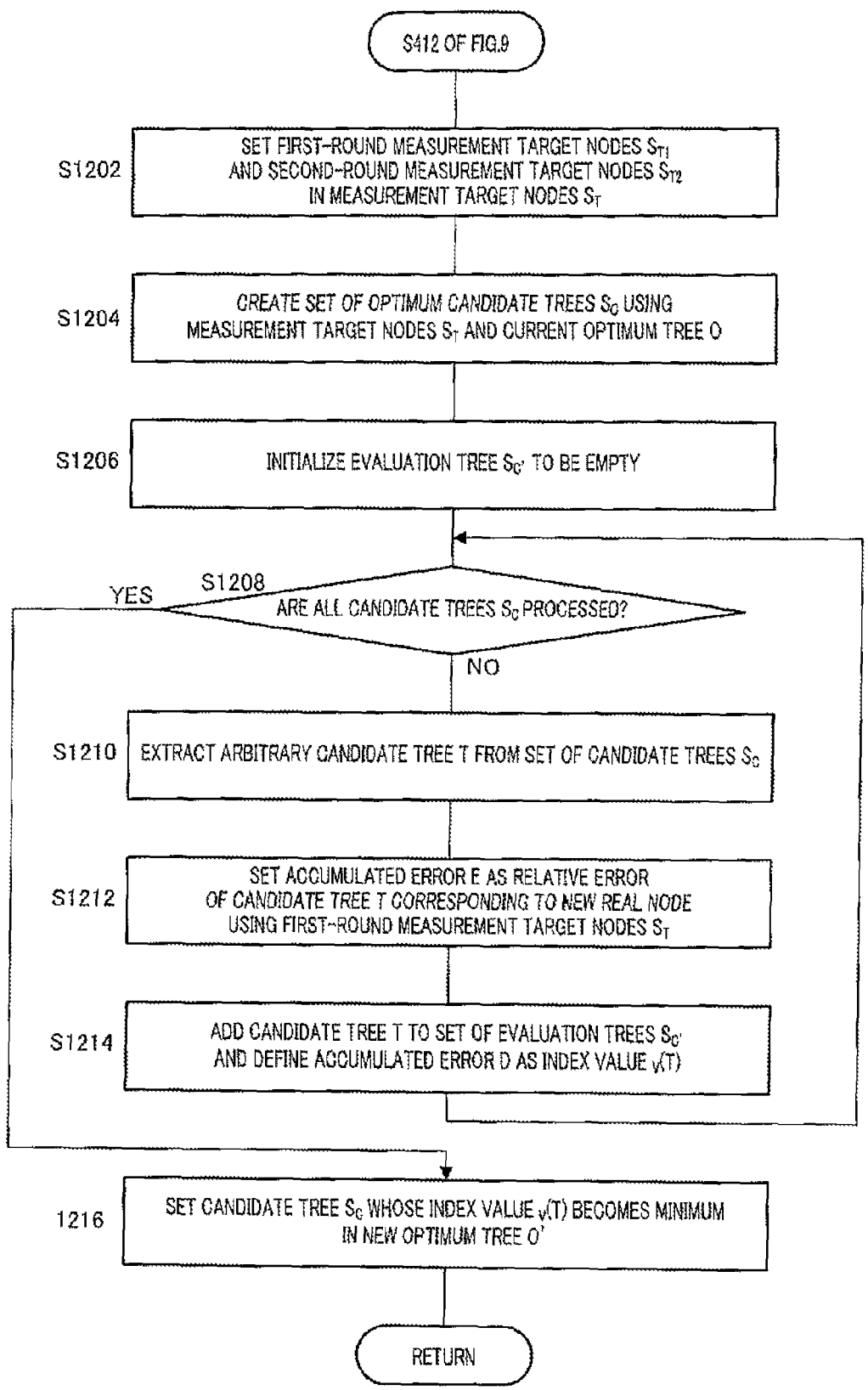
FIG. 19 is a flowchart illustrating details of the processing of creating a new optimum tree according to the present embodiment.

FIG. 19 is a flowchart showing details of the processing of creating a new optimum tree in step S412 of FIG. 9.

Second-round measurement target node selection section 310 sets both first-round measurement target nodes $S_{T1}$ and second-round measurement target nodes $S_{T2}$ in current measurement target nodes $S_T$ (S1202). Second-round measurement target node selection section 310 then creates candidate tree $S_C$ based on current measurement target nodes $S_T$ and current optimum tree O using candidate tree creation section 312 (S1204). Furthermore, second-round measurement target node selection section 310 initializes evaluation tree $S_{C'}$ to be empty (S1206). Second-round measurement target node selection section 310 then repeats the processes in following steps S1210 to S1214 while unprocessed candidate nodes $S_C$ remain (S1208).

First, second-round measurement target node selection section 310 extracts one arbitrary candidate tree T from the set of candidate trees $S_C$ (S1210). Second-round measurement target node selection section 310 then calculates accumulated error E at the point in time using first-round measurement target nodes $S_{T1}$ and sets it as a relative error in candidate tree T corresponding to a new real node (S1212). Details of the processing of calculating this accumulated error E will be described later. Second-round measurement target node selection section 310 then adds candidate tree T to the set of evaluation trees $S_{C'}$ and defines calculated accumulated error E as index value v(T) of candidate tree T (S1214).

When all candidate trees $S_C$ are processed, optimum tree processing section 314 determines candidate tree Sc whose index value v(T) becomes a minimum among all candidate trees $S_C$ to be new optimum tree O' (S1216). Candidate tree Sc whose index value v(T) becomes a minimum is namely candidate tree $S_C$ whose relative error becomes a minimum.

Figure 20:
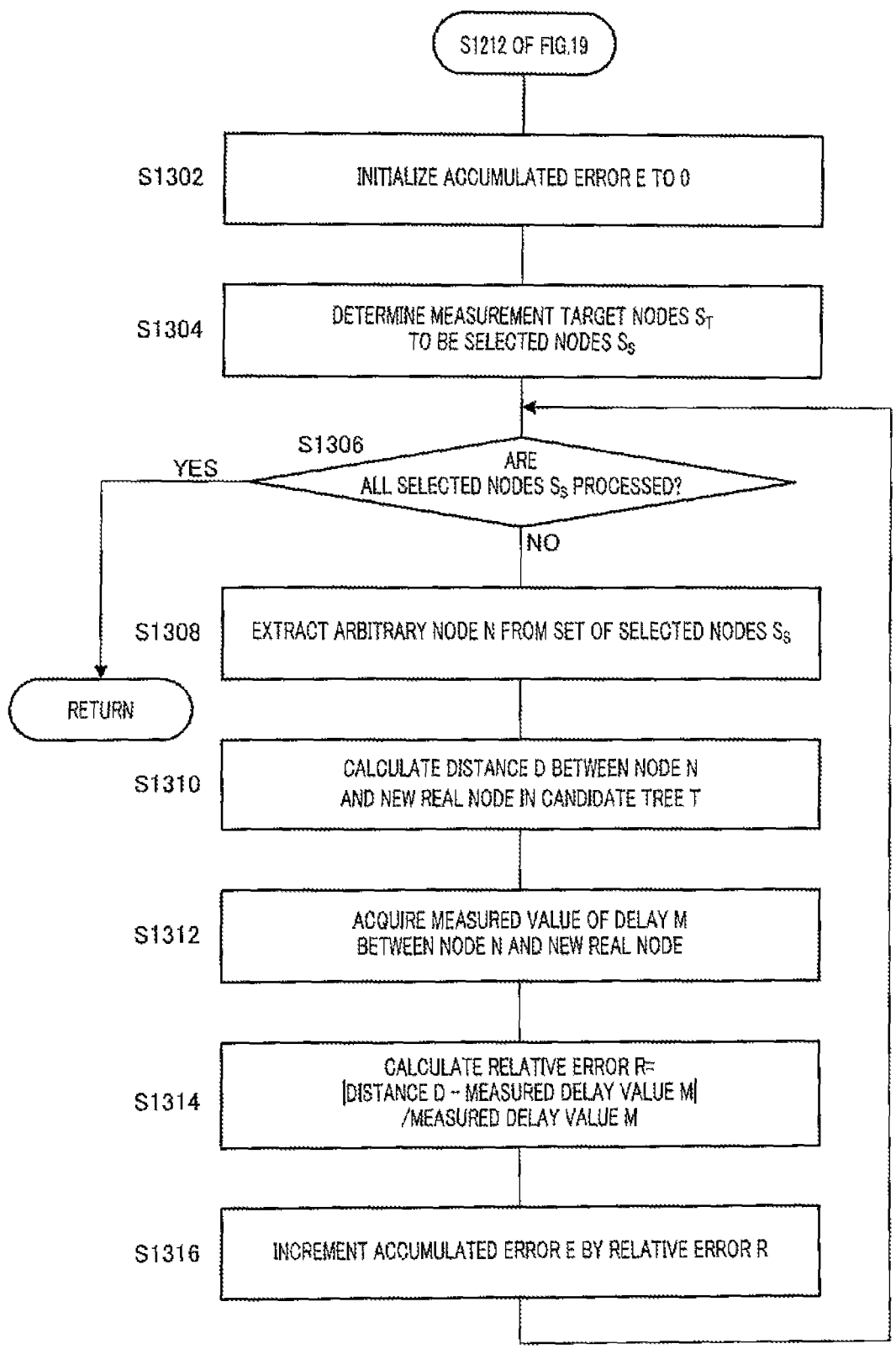
FIG. 20 is a flowchart illustrating details of the processing of calculating accumulated errors according to the present embodiment.

FIG. 20 is a flowchart illustrating details of the processing of calculating an accumulated error in step S1212 of FIG. 19.

Second-round measurement target node selection section 310 initializes accumulated error E to 0 (S1302) and determines measurement target nodes $S_T$ to be selected nodes Ss (S1304). Second-round measurement target node selection section 310 then repeats the processes in following steps S1308 to S1316 while unprocessed selected nodes $S_S$ remain.

First, second-round measurement target node selection section 310 extracts one arbitrary node N from the set of selected nodes $S_S$ (S1308). Second-round measurement target node selection section 310 then calculates distance D between node N and a new real node (joining node) in candidate tree T (S1310). Furthermore, second-round measurement target node selection section 310 acquires real measured delay value (network metric) M between node N and new real node (joining node) from metric database 320 (S1312). Second-round measurement target node selection section 310 then calculates a value obtained by dividing the absolute value of the difference between distance D and measured delay value M by measured delay value M as relative error R (S1314). Second-round measurement target node selection section 310 then increments accumulated error E by calculated relative error R (S1316).

As described above, network delay estimation apparatus 302 can select first-round measurement target nodes $S_{T1}$ and second-round measurement target nodes $S_{T2}$. Network delay estimation apparatus 302 can then create new optimum tree O' with the joining node added thereto based on first-round measurement target nodes $S_{T1}$ and second-round measurement target nodes $S_{T2}$ and current optimum tree O.

As described above, network delay estimation apparatus 302 according to the present embodiment performs careful node sampling on a measurement target. That is, network delay estimation apparatus 302 selects real nodes whose distances from the joining node are measured as the first-round measurement target nodes and the second-round measurement target nodes. The first-round measurement target nodes include a pair of real nodes having the longest path in the current optimum tree, that is, the real nodes located at the outermost position. The second-round measurement target nodes are real nodes having a short distance from the joining node in a path connecting the pair of first-round measurement target nodes. This allows network delay estimation apparatus 302 to estimate nodes close to the joining node with high accuracy.

Furthermore, network delay estimation apparatus 302 performs delay measurement focusing only on the first-round measurement target nodes and the second-round measurement target nodes, and creates a new optimum tree by adding the measurement result to the current optimum tree. This allows network delay estimation apparatus 302 to create a new optimum tree (metric tree) with high accuracy and in a short time.

For example, as an upstream process of calculating a delivery tree of terminal relay type multipoint communication, creating such a metric tree makes it possible to obtain information necessary to calculate the delivery tree in a shorter wait time. As a result, communication can be started in a short time. Furthermore, network delay estimation apparatus 302 repeats this processing, and can thereby configure a metric tree with fewer errors with respect to a delay measured value in the entire network.

Network delay estimation apparatus 302 of the present embodiment adds first-round measurement target nodes in two stages to thereby reduce measurement errors, but may also limit the addition to one stage or may add the nodes in three stages. For example, in the third stage, network delay estimation apparatus 302 may select and add real nodes most distant from the primary first-round measurement target nodes and the secondary first-round measurement target nodes respectively.

As described above, the network delay estimation apparatus according to the present embodiment is a network delay estimation apparatus that creates a metric tree describing delays among nodes of a network including a plurality of nodes, including a first-round measurement target node selection section that selects one pair or a plurality of pairs of nodes located at a long distance from each other as first-round measurement target nodes from a known metric tree and measures a distance between an arbitrary node and each first-round measurement target node, a second-round measurement target node selection section that selects a node whose distance from the arbitrary node is estimated to be short as a second-round measurement target based on the distance from the first-round measurement target node and the known metric tree and measures a distance between the arbitrary node and each second-round measurement target node and an optimum tree processing section that creates a metric tree of a network including the arbitrary node based on the distance from the second-round measurement target node and the known metric tree. Furthermore, the second-round measurement target node selection section estimates a node at a position having a short distance from a path connecting the first-round measurement target nodes as a node having a short distance from the arbitrary node. Thus, the present embodiment can create a metric tree with high accuracy and in a short time.

The disclosure of Japanese Patent Application No. 2010-185028, filed on Aug. 20, 2010, including the specification, drawings and abstract is incorporated herein by reference in its entirety.

Industrial Applicability

The network delay estimation apparatus and the network delay estimation method according to the present invention are useful as a network delay estimation apparatus and a network delay estimation method capable of creating a metric tree with high accuracy and in a short time. That is, the present invention is suitable for various applications necessary to acquire network metrics.

REFERENCE SIGNS LIST

100 Network system
102 to 114 Node
116 Network
200 Optimum tree
202 to 214 Real node
216 to 224 Virtual node
226 to 246 Weighted edge
302 Network delay estimation apparatus
304 Event detection section
306 First-round measurement target node selection section
308 Metric processing section
310 Second-round measurement target node selection section
312 Candidate tree creation section
314 Optimum tree processing section
316 Delivery tree construction section
318 Candidate tree database
320 Metric database
322 Optimum tree database

The invention claimed is:

1. A network delay estimation apparatus that creates a metric tree describing delays among nodes of a network including a plurality of nodes, comprising:
  a processing unit having a plurality of sections configured to execute steps of a control program;
  a storage memory medium configured to store the steps of the control program;
  a first-round measurement target node selection section configured to select from a known metric tree a pair of nodes located at a longest distance from each other as a pair of first-round measurement target nodes and to measure distances between a joining node whose position with respect to the network is unknown and each of the first-round measurement target nodes;
  a second-round measurement target node selection section configured to estimate a node whose distance from the joining node is estimated to be shortest based on the distances between the joining node and each of the first-round measurement target nodes, to select the estimated node as a second-round measurement target node, and to measure a distance between the joining node and the second-round measurement target node; and
  an optimum tree processing section configured to create a new metric tree including the joining node based on the first-round measurement target nodes, the second-round measurement target nodes, and the known metric tree,
  wherein the second-round measurement target node selection section is configured to estimate a node at a position having a shortest distance from a path connecting the first-round measurement target nodes to be the node having a shortest distance from the joining node, further comprising a candidate tree creation section configured to create candidate trees with the joining node added to the known metric tree based on the first-round measurement target nodes and the second-round measurement target node selected based on the first-round measurement target nodes, and wherein:

the optimum tree processing section is configured to determine, out of the candidate trees, a candidate tree containing fewer errors with respect to measured values of each distance between the joining node and the first-round measurement target nodes and the second-round measurement target nodes to be the network metric tree including the joining node.

2. The network delay estimation apparatus according to claim 1, wherein when there are a plurality of paths connecting the first-round measurement target nodes, the second-round measurement target node selection section is configured to estimate a plurality of nodes to be nodes having a short distance from the joining node, while giving priority to nodes having a short distance from the joining node, in a path, and the optimum tree processing section is configured to determine a candidate tree containing the fewest errors to be the network metric tree including the joining node.

3. The network delay estimation apparatus according to claim 1, further comprising an optimum tree database that stores the metric tree created by the optimum tree processing section as the known network tree in subsequent processing.

4. A network delay estimation apparatus that creates a metric tree describing delays among nodes of a network including a plurality of nodes, comprising:

a processing unit having a plurality of sections configured to execute steps of a control program;

a storage memory medium configured to store the steps of the control program;

a first-round measurement target node selection section configured to select from a known metric tree a pair of nodes located at a longest distance from each other as a pair of first-round measurement target nodes and to measure distances between a joining node whose position with respect to the network is unknown and each of the first-round measurement target nodes;

a second-round measurement target node selection section configured to estimate a node whose distance from the joining node is estimated to be shortest based on the distances between the joining node and each of the first-round measurement target nodes, to select the estimated node as a second-round measurement target node, and to measure a distance between the joining node and the second-round measurement target node; and an optimum tree processing section configured to create a new metric tree including the joining node based on the first-round measurement target nodes, the second-round measurement target nodes, and the known metric tree, wherein the first-round measurement target node selection section is configured to, in addition to the pair of nodes located at a longest distance from each other, further select a node located at a longest distance from the path connecting the pair of nodes as the first-round measurement target node.

5. The network delay estimation apparatus according to claim 1, wherein the first-round measurement target node selection section, the second-round measurement target node selection section and the optimum tree processing section are configured to start operating on condition that the joining node is added to the network.

6. A network delay estimation method for creating a metric tree describing delays between nodes of a network including a plurality of nodes, comprising:

a step of selecting from a known metric tree a pair of nodes located at a longest distance from each other as first-round measurement target nodes and measuring distances between a joining node whose position with respect to the network is unknown and each of the first-round measurement target nodes;

a step of estimating a node whose distance from the joining node is estimated to be shortest based on the distances between the joining node and each of the first-round measurement target nodes;

a step of selecting the estimated node as a second-round measurement target;

a step of measuring a distance between the joining node and the second round measurement target node; and a step of creating a new metric tree including the joining node based on the first-round measurement target nodes, the second-round measurement target nodes, and the known metric tree; and a step of creating candidate trees with the joining node added to the known metric tree based on the first-round measurement target nodes and the second-round measurement target node selected based on the first-round measurement target nodes; and a step of determining a candidate tree containing fewer errors with respect to measured values of each distance between the joining node and the first-round measurement target nodes and the second-round measurement target nodes to be the network metric tree including the joining node.

* * * * *